No. 861,862. PATENTED JULY 30, 1907.
J. KENLON.
FIRE TRUCK SIGNAL.
APPLICATION FILED MAY 22, 1906.
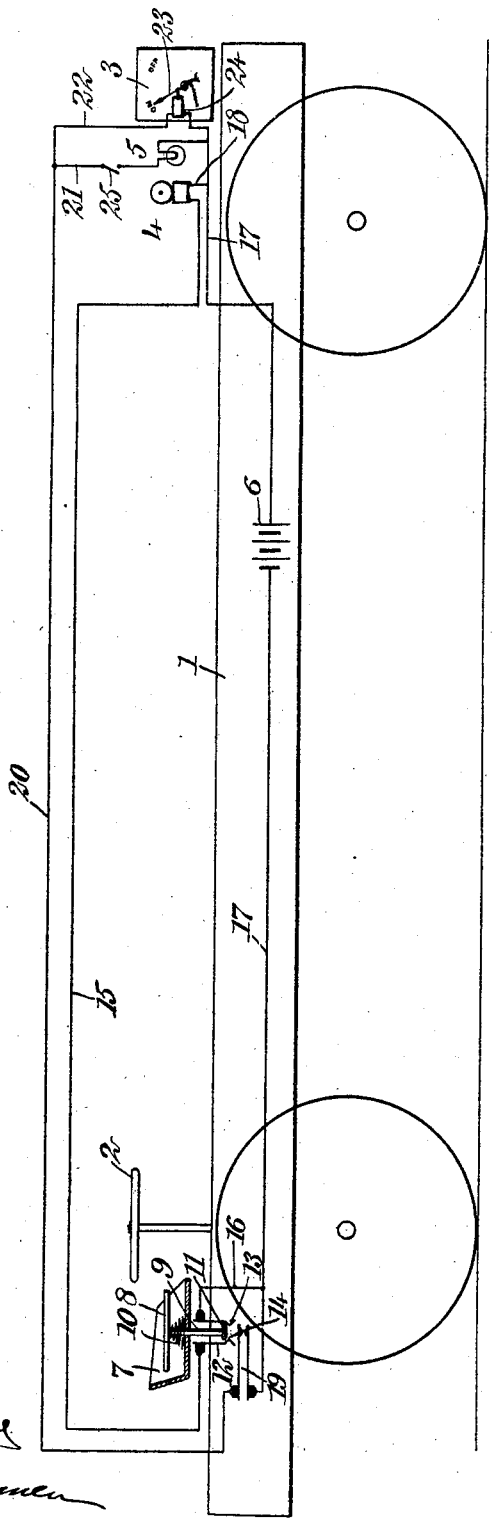
WITNESSES
INVENTOR
John Kenlon
BY
ATTORNEYS

UNITED STATES PATENT OFFICE.

JOHN KENLON, OF NEW YORK, N. Y.

FIRE-TRUCK SIGNAL.

No. 861,862.      Specification of Letters Patent.      Patented July 30, 1907.

Application filed May 22, 1906. Serial No. 318,143.

*To all whom it may concern:*

Be it known that I, JOHN KENLON, a citizen of the United States, and a resident of the city of New York, borough of Manhattan, in the county and State of New York, have invented a new and Improved Fire-Truck Signal, of which the following is a full, clear, and exact description.

This invention relates to signals, and is intended to be used on fire trucks to prevent accidents.

When fire trucks are leaving an engine house, it frequently happens that the driver will start the horses before the steersman has taken his place at the steering wheel. When this occurs, there is danger that the rear part of the truck will strike the doorway of the engine house, injuring the apparatus and endangering the firemen.

The object of the invention is to provide a simple signal apparatus which will operate to announce to the driver when the steersman is ready at the steering wheel.

The invention consists in the construction and combination of parts, to be more fully described hereinafter and particularly set forth in the claims.

The drawing illustrates the apparatus diagrammatically.

Referring more particularly to the parts, 1 represents, diagrammatically, the body of a fire truck, such as a hook and ladder truck. This truck is steered at its rear end by means of a steering wheel 2 arranged in any usual manner. Near the front of the truck at the driver's position, I provide a signal such as an annunciator 3, a bell 4 and an electric light 5. At a suitable point on the truck body a battery 6 is provided. At the rear end of the truck, in a conveniently placed position to reach the wheel 2, I provide a steering seat 7. This steering seat comprises a depressible bottom 8 which is provided with a stem 9 which extends downwardly through the body of the seat, as indicated, said depressible bottom being normally maintained in an elevated position by means of a suitable coiled spring 10 which rests upon the body of the seat as shown. The lower extremity of the stem 9 is provided with a bridging contact plate 11. It should be understood that when the steersman takes his seat, the member 8 is depressed, so that the contact plate 11 descends. Lying in the path of this contact plate 11, I provide contacts 12 and 13 which are formed with inwardly projecting lips 14 near their lower extremities. To these contact plates 12 and 13, conductors 15 and 16 respectively attach. The conductor 16 connects with a main wire or conductor 17 and the conductors 15 and 17 both extend longitudinally of the truck to the forward end thereof, where the conductor 15 is connected with the bell 4 aforesaid.

In the main conductor 17 the battery 6 is placed, as shown, and beyond this battery a conductor 18 connects the bell 4 with the conductor 17. The contacts 12 and 13 constitute bell contacts, and will be referred to as such hereinafter.

At a suitable point beneath the stem 9 and in a position to be struck thereby, I provide contacts 19. To one of these contacts the main wire or conductor 17 is attached, as shown. From the other contact a conductor 20 extends toward the front of the truck, where it forms branches 21 and 22, the former of which connects the electric light 5 with the conductor 17 aforesaid, while the latter connects the aforesaid annunciator 3 with the conductor 17. In this way the annunciator and the light are placed in parallel between the conductors 17 and 20.

The annunciator 3 may be of any suitable form, having any suitable means for indicating when the circuit is closed through it and when the circuit is open; therefore, the mechanism of this annunciator may consist simply of a needle 23 controlled by an electro-magnet 24, which electro-magnet is connected with the conductor 22 aforesaid. In the branch 21 I provide a switch 25 which enables the circuit to be closed through the light, or broken, as may be desired. The figure represents the contacts and circuits in normal condition.

When the steersman takes his seat, the stem 9 in passing downwardly, closes a circuit through the contacts 12 and 13, by means of the contact 11 which bridges between the lips 14. The circuit referred to at this point is as follows: From the battery 6 through the conductors 17 and 16, contacts 12 and 13, conductor 15, through the bell and back to the battery. As the downward movement of the seat bottom 8 continues, the circuit is broken at the contacts 12 and 13 and the lower end of the stem 9 carrying the contact 11 presses the contacts 19 into engagement with each other. In this way the circuit established through the bell becomes broken and a new circuit is established, which is substantially as follows: From the battery 6, through the conductor 17, contacts 19, conductor 20, through the branch 22 and the annunciator, back to the battery. In this way the annunciator is made to indicate when the steersman is ready at the wheel and if for any reason the steersman should move from his position, the spring 10 will operate to force the seat bottom 8 upwardly, opening the circuit just described, through the annunciator and closing the bell circuit for an instant. In this way, any change at the annunciator will be indicated by the ringing of the bell, which calls the driver's attention thereto.

When the apparatus is being used at night, the switch 25 will be closed, so that a parallel branch circuit is formed through the electric light 5. In this way the annunciator will be made clearly visible.

Having thus described my invention, I claim as new and desire to secure by Letters Patent:

1. A fire-truck having steering mechanism near the rear end thereof, a depressible seat near said steering mechanism, an alarm bell, means for sounding said alarm as said seat descends, and an annunciator at the forward end of said truck, and indicating to the driver when said seat is depressed.

2. A fire-truck having steering mechanism near the rear thereof, a depressible seat for the steersman near said mechanism, an alarm, and an annunciator mounted forwardly of said truck, electric circuits passing respectively through said alarm and said annunciator, contacts adapted to be closed only when said seat is in a partly depressed position and affording means for closing the circuit through said alarm, and contacts adapted to be closed when said seat is completely depressed and closing the circuit through said annunciator.

In testimony whereof I have signed my name to this specification in the presence of two subscribing witnesses.

JOHN KENLON.

Witnesses:
 F. D. AMMEN,
 JNO. M. RITTER.